(12) United States Patent
Sripada

(10) Patent No.: US 9,069,455 B2
(45) Date of Patent: Jun. 30, 2015

(54) 3D USER INTERFACE FOR APPLICATION ENTITIES

(75) Inventor: Nagaraj Sripada, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 288 days.

(21) Appl. No.: 13/530,737

(22) Filed: Jun. 22, 2012

(65) Prior Publication Data

US 2013/0346911 A1 Dec. 26, 2013

(51) Int. Cl.
| | |
|---|---|
| G06F 3/048 | (2013.01) |
| G06F 3/0488 | (2013.01) |
| G06F 3/01 | (2006.01) |
| G06F 3/0484 | (2013.01) |
| G06F 3/0482 | (2013.01) |
| G06T 19/20 | (2011.01) |
| G06T 19/00 | (2011.01) |
| G06F 3/0481 | (2013.01) |
| G06T 17/00 | (2006.01) |

(52) U.S. Cl.
CPC .............. *G06F 3/0488* (2013.01); *G06F 3/017* (2013.01); *G06F 3/04842* (2013.01); *G06F 3/0482* (2013.01); *G06T 19/20* (2013.01); *G06T 19/003* (2013.01); *G06F 3/04817* (2013.01); *G06T 17/00* (2013.01); *G06T 19/00* (2013.01); *G06F 3/048* (2013.01); *G06T 2219/2016* (2013.01); *G06F 2203/04802* (2013.01); *G06F 3/04815* (2013.01)

(58) Field of Classification Search
CPC ... G06F 3/04815; G06F 3/0482; G06F 3/017; G06F 3/048; G06F 3/0488; G06F 3/04842; G06F 2203/04802; G06F 3/04817; G06T 19/20; G06T 19/003; G06T 2219/2016; G06T 19/00; G06T 17/00

USPC ................ 715/757, 782, 836, 848, 850, 852; 345/653, 664, 679

See application file for complete search history.

(56) References Cited

U.S. PATENT DOCUMENTS

| | | | | |
|---|---|---|---|---|
| 5,678,015 | A | * 10/1997 | Goh | 715/782 |
| 2003/0142136 | A1 | * 7/2003 | Carter et al. | 345/782 |
| 2006/0020888 | A1 | * 1/2006 | Kang et al. | 715/708 |
| 2006/0069698 | A1 | 3/2006 | Hintikka | |

(Continued)

OTHER PUBLICATIONS

Kranz, et al., "A Display Cube as a Tangible User Interface", Retrieved at <<http://citeseerx.ist.psu.edu/viewdoc/download-?doi=10.1.1.148.6360&rep=rep1&type=pdf>>, Proceedings of Adjunct Proceedings of the Seventh Internation Conference on Ubiquitous Computing, 2005, Sep. 2005, pp. 2.

(Continued)

*Primary Examiner* — William Bashore
*Assistant Examiner* — James F Sugent
(74) *Attorney, Agent, or Firm* — Bryan Webster; Kate Drakos; Micky Minhas

(57) ABSTRACT

Embodiments relate to three-dimensional user interfaces for managing and accessing applications. Applications are stored on storage of a device. A user interface is displayed on a display. The user interface includes interactively rotatable three-dimensional structures each comprised of regions, each region displaying a graphic representing a corresponding application, the applications activatable by interaction with the three-dimensional structures. Applications can be assigned to structures (volumes) manually or automatically. The three-dimensional structures may be rotated and otherwise manipulated by user input.

17 Claims, 10 Drawing Sheets

(56) References Cited

U.S. PATENT DOCUMENTS

| | | | |
|---|---|---|---|
| 2007/0035564 A1* | 2/2007 | Katsuyama | 345/649 |
| 2007/0169066 A1* | 7/2007 | Nielsen | 717/162 |
| 2008/0022228 A1* | 1/2008 | Kwon et al. | 715/838 |
| 2008/0122840 A1 | 5/2008 | Falco | |
| 2009/0089692 A1* | 4/2009 | Morris | 715/764 |
| 2009/0164945 A1* | 6/2009 | Li | 715/849 |
| 2010/0050129 A1 | 2/2010 | Li et al. | |
| 2010/0064259 A1* | 3/2010 | Alexanderovitc et al. | 715/852 |
| 2010/0093400 A1* | 4/2010 | Ju et al. | 455/566 |
| 2010/0169836 A1* | 7/2010 | Stallings et al. | 715/848 |
| 2010/0333017 A1 | 12/2010 | Ortiz | |
| 2011/0083078 A1* | 4/2011 | Ju | 715/738 |
| 2011/0107269 A1* | 5/2011 | Chiu et al. | 715/849 |
| 2011/0242102 A1 | 10/2011 | Hess | |
| 2011/0246950 A1 | 10/2011 | Luna et al. | |
| 2011/0307834 A1* | 12/2011 | Wu | 715/836 |
| 2012/0094719 A1* | 4/2012 | Choi et al. | 455/566 |

OTHER PUBLICATIONS

"Cube Desktop User Manual", Retrieved at <<http://www.thinkinbytes.com/downloads/manuals/cubedesktop-en.pdf>>, Mar. 2008, pp. 17.

Miller Paul, "SurfCube gives Windows Phone 7 the 3D browser it needed so desperately", Retrieved at <<http://www.engadgetcom/2010/12/29/surfcube-gives-windows-phone-7-the-3d-browser-it-needed-so-despe/>>, Dec. 29, 2010, pp. 5.

* cited by examiner

124

| app ID | tags | user assignment(s) (cube/face ID) | auto assignment(s) (cube/face ID) |
|---|---|---|---|
| 1 | <phone>, <location> | <*> | <1, 3> |
| 1.1 | <settings> | <2.3> | <*> |
| 1.2 |  | <*> | <3.*> |
| 2 | <math>, <media>, <browsing> | <2> | <*> |
| 2.1 | <> | <4.2> | <*> |
| 3 | <rating=3>, <location> | <2,5,8> | <*> |
| ... | ... | ... | ... |
| N | ... | ... | ... |

FIG. 4

3D USER INTERFACE FOR APPLICATION ENTITIES

BACKGROUND

To help users manage and access applications installed on computing devices, various types of user interfaces have been devised. Typically, applications are represented by icons. The icons are displayed in folders, screens, and other two-dimensional formats. Often, a user is able to move icons, remove icons, specify icon locations, and so forth. When an application is installed or added to a shell or environment, an icon or graphic for the application is usually placed on a simple basis such as a next available slot in a folder, alphabetical position in a list, a user designated location, etc.

Such user interfaces, sometimes called shells or environments, may lack efficiencies, conveniences, and aesthetics. For example, a two-dimensional graphic shell may display pages of application icons. There may be no hints as to what is near the current page, what pages or elements a represented application may have, or what displayed elements an application may have. Consider also that various navigational operations may be abrupt. For example, to view a next page or set of application icons, an entire new page might be rendered. The newly displayed icons may have little relationship to the previously displayed icons, requiring the user to completely re-orient to the new information. Finally, organization may be limited to laborious manual formation and arrangement of containers such as folders.

Techniques related to three-dimensional user interfaces, in particular in relation to managing and accessing applications on a computing device, are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments relate to three-dimensional user interfaces for managing and accessing applications. Applications are stored on storage of a device. A user interface is displayed on a display. The user interface includes interactively rotatable three-dimensional structures each comprised of regions, each region displaying a graphic representing a corresponding application, the applications activatable by interaction with the three-dimensional structures. Applications can be assigned to structures (volumes) manually or automatically. The three-dimensional structure may be rotated and otherwise manipulated by user input.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 4 shows an example of metadata.

DETAILED DESCRIPTION

Figure 1:
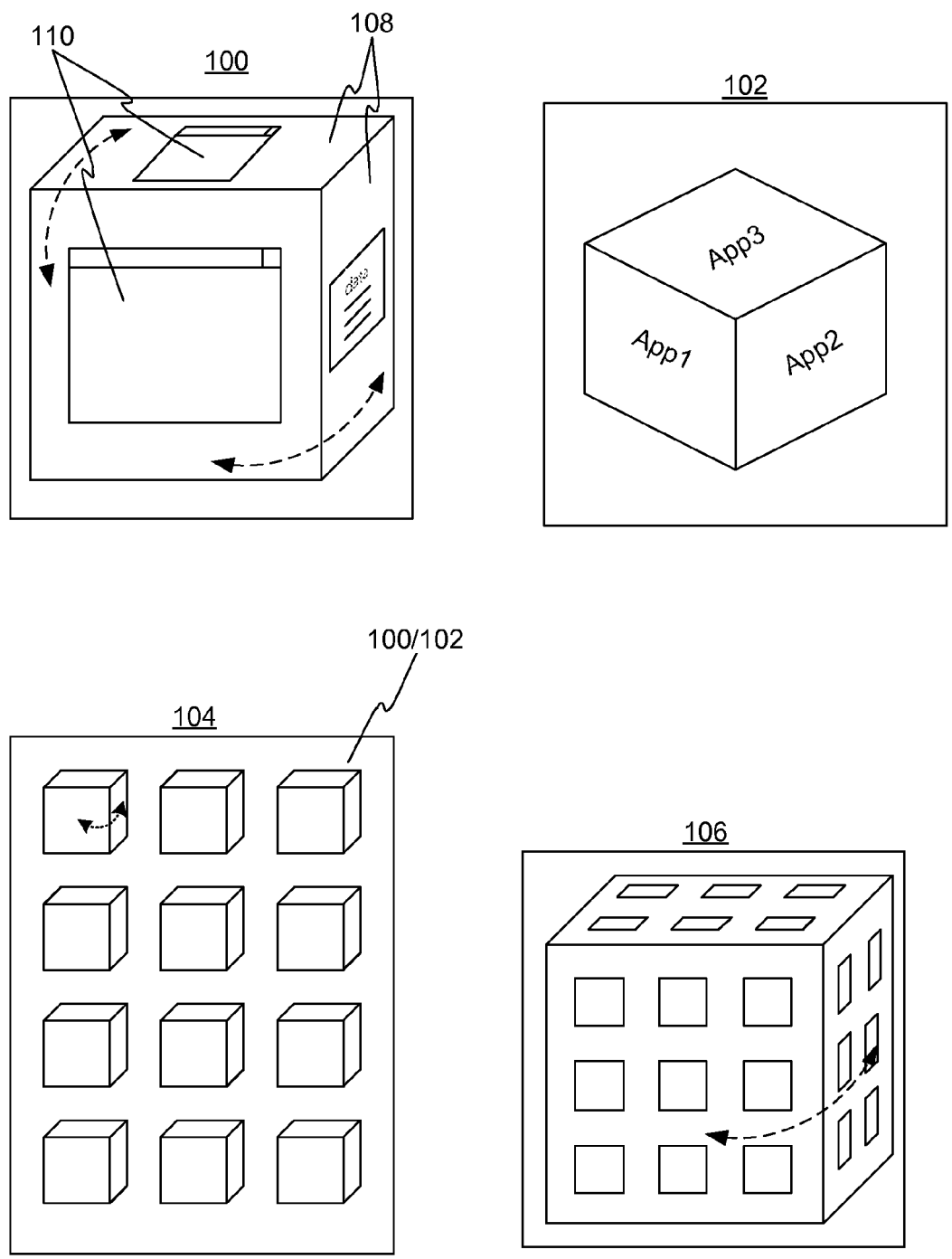
FIG. 1 shows some examples of three-dimensional user interfaces.

FIG. 1 shows some examples of three-dimensional user interfaces 100, 102, 104, 106. A basic concept used herein will be that of a three-dimensional volume with faces. A volume or its faces may correspond to applications or elements (sub-applications) thereof, with appropriate icons or graphic representations displayed thereon. A volume may be any three-dimensional volumetric shape, such as a pyramid, cube, any polyhedron, etc. When displayed, the volume may have graphic faces and edges, or alternatively, transparent or semi-transparent faces and/or edges (or no edges). For instance icons may be arranged to "float" in three-dimensions in positions that correspond to the faces of a dodecahedron, but the actual faces may or may not be shown. A volume may also be a group of planar regions (possibly irregular or asymmetric and bounding a three-dimensional space) that are displayed and manipulated as a single structural unit. With this meaning of "volume" understood, for explanation an example volume—a cube—will be used herein. Where the term "cube" is used, the term "volume" will be considered applicable. In short, the shape and appearance of volumes can vary and is not important to the embodiments described herein.

A first cube 100 is shown in FIG. 1. The first cube 100 has faces 108 displaying icons 110. The dashed arrows indicate the ability of the first cube 100 to be interactively rotated by user input. The box around the first cube 100 represents a window, a face of a containing cube, a display area, a display, etc. The example of first cube 100 is a case where the cube corresponds to a single application, and the icons 110 represent discrete elements of the application. These discrete elements, to be referred to herein as "sub-applications", may be, for example, interface dialogs, documents corresponding to the application, menus, related data (e.g., a call log), configuration settings, etc. For example, if the application is a web browser, one face 108 may contain an icon for a "favorites" set of uniform resource locators (URLs), one face 108 may have an icon representing a main window with tabs for pages, etc.

A second cube 102 in FIG. 1 is an example where faces of a volume contain applications (icons/graphics representing same). The second cube 102 may also be interacted with, rotated, and used as a point to launch the applications represented thereon. As described later with reference to FIG. 10, assuming that the application of the first cube 100 corresponds to an application represented on the second cube 102 (e.g., "App1"), a user may navigate back and forth between the first cube 100 and the second cube 102. An icon for "App1" may be selected by a user on the second cube 102, which causes a graphic transition to the first cube 100. Conversely, a user command may cause the user interface to graphically transition from the first cube 100 to the second cube 102. A transition may involve an animation showing a selected face on a cube moving to occupy the current view, or a de-selected face being supplanted by its cube in the view.

Figure 9:
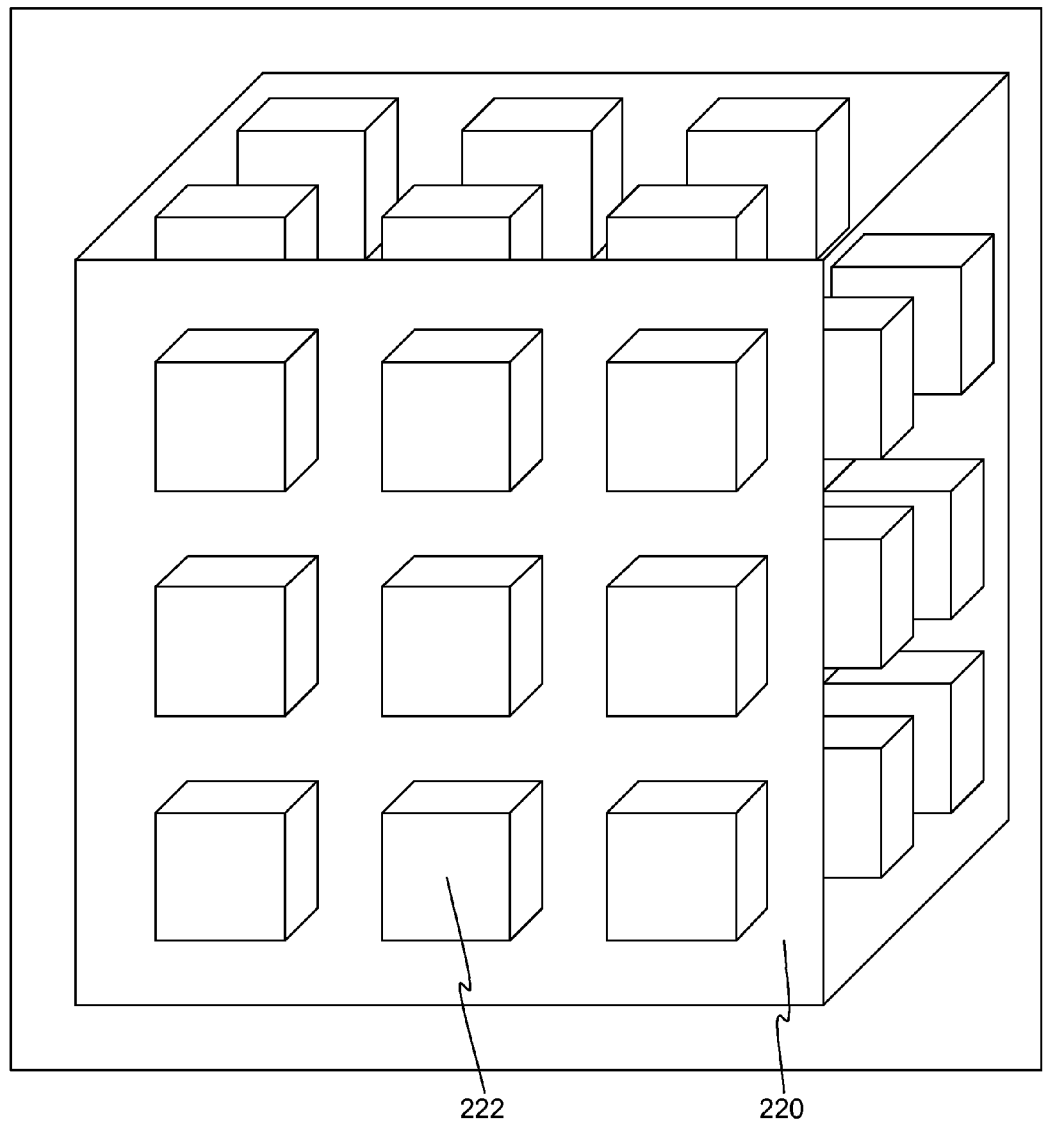
FIG. 9 shows another implementation of the second user interface.

The shell or user interface may also display a higher level composite view of cubes. A first user interface 104 is comprised of cubes which may be similar to the first cube 100 and/or the second cube 102 (or even a cube like that shown in the second user interface 106). As discussed later with reference to FIG. 10, a user may navigate back and forth between the user interface 104 and the first cube 100 (or the second cube 102). When the first cube 100, for example, is selected in the first user interface 104, the user interface transitions graphically from displaying the first user interface 104 to displaying the first cube 100. The user may navigate back to the first user interface 104. Details of the first user interface 104 are discussed below with reference to FIG. 7. In another embodiment, a composite view is itself a cube, as shown by second user interface 106. Note that the icons in the second user interface 106 may instead be volumes, as shown in FIG. 9.

Figure 2:
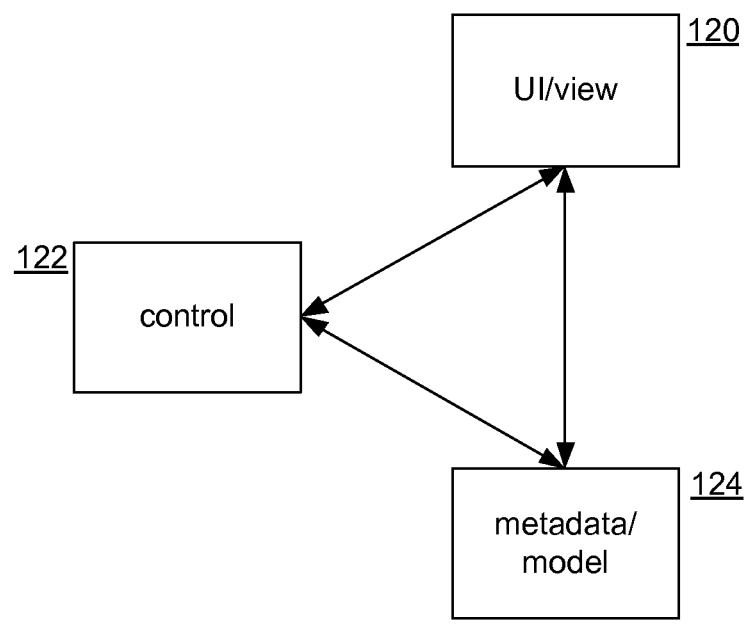
FIG. 2 shows a design that may be used to implement embodiments described herein.

FIG. 2 shows a design that may be used to implement embodiments described herein. Assuming a computing device with a processor, storage, and a display, a user interface 120 (or view) is displayed on the display. A control process 122 is executed by the processor. Metadata 124 (or model) is stored and used by the control process 122. The user interface or view 120 may be any of the embodiments described herein. The control process 122 may perform various functions such has handling user input, implementing user interface logic, managing assignment of applications and sub-applications to cubes and faces, responding to events from user interface elements, and so forth. The metadata 124 may be information about the state and configuration of the user interface or view 120, information about applications, user preferences and settings, etc.

Figure 3:
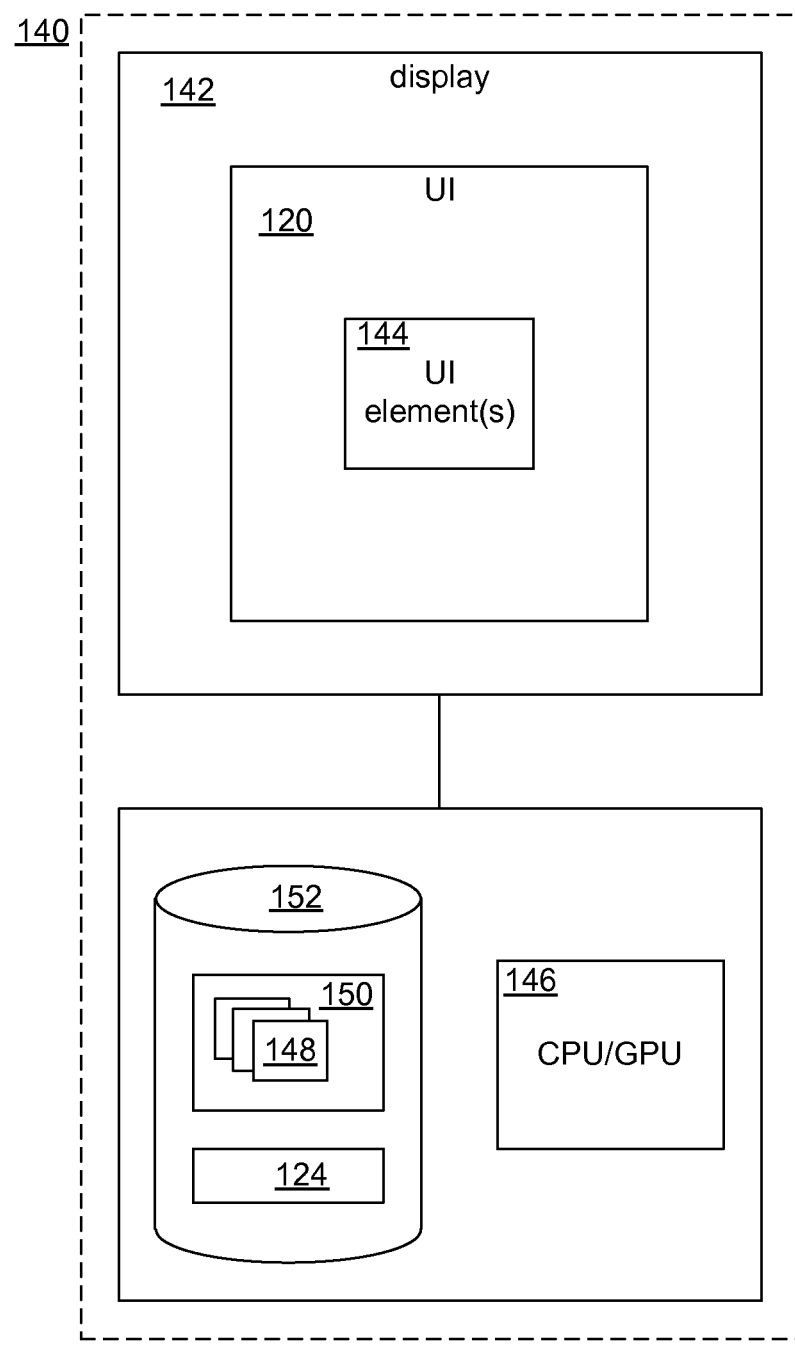
FIG. 3 shows a computing device on which embodiments described herein may be practiced.

FIG. 3 shows a computing device 140 on which embodiments described herein may be practiced. The computing device 140 may have a display 142 on which user interface 120 and user interface elements 144 (e.g., cubes, faces, pop-up menus, animations, buttons, etc.) thereof are displayed. The computing device 140 also has a processor 146 to execute the control process 122 as well as applications 148 installed on an operating system 150. In addition to storing the operating system 150 and applications 148, storage 152 stores the metadata 124.

FIG. 4 shows an example of the metadata 124. While shown in tabular form, the metadata 124 may be stored as a small database, an XML (eXtensible Markup Language) file, serialized objects, etc. The metadata 124 may have identifiers (e.g., "1") to identify applications, as well as identifiers for sub-applications, if any (e.g., "1.1"). An application may be associated with various tags to describe attributes of an application, although attributes and information about an application may be obtained from other sources. Assignment data may indicate which cubes or faces an application or sub-application is associated with. An application or sub-application may have more than one association and may be manually or automatically assigned. Manual assignment may involve indicating a target cube or face when installing an application, dragging an application icon or a copy thereof to a target face or cube, and so forth. When a manual assignment is made a corresponding update is made in the metadata 124.

Automatic assignment can be performed in a number of ways. If a cube or face has one or more tags, applications or sub-applications with matching tags may be assigned accordingly. Some tags may have higher precedence. For example, if there is a cube that is tagged as "photos", applications tagged as or related to "photos" may be assigned to that cube. If an application has no tags, other data may be used for auto-assignment, such as date of installation, which cubes/faces have open space, etc. Note that a user rating may be assigned to an application, and applications may be assigned to be grouped on cubes to reflect the user's preferred applications. In one embodiment, manual user assignments take precedence, and in another embodiment an application is represented on any cube or face to which it is assigned, regardless of whether automatically or manually assigned.

Figure 5:
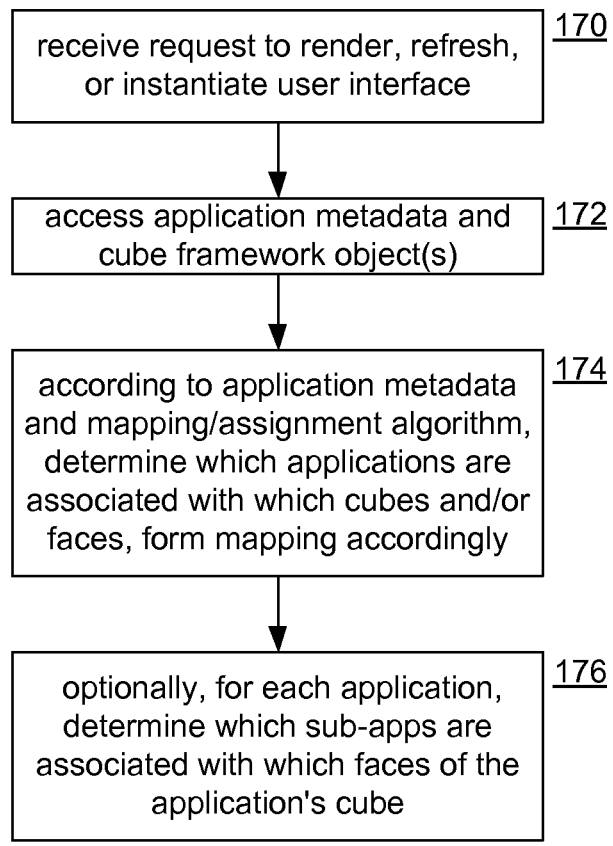
FIG. 5 shows a process for assigning applications and sub-applications to cubes and faces.

FIG. 5 shows a process for assigning applications and sub-applications to cubes and faces. Initially, at step 170, there is a request to render, refresh, or instantiate a three-dimensional user interface. At step 172 the metadata 124 is accessed, as well as information about which applications are installed (application identifiers) and which cubes and faces exist (e.g., a cube framework or software objects). At step 174 the process may perform an algorithm for automatic assignment. Tags and other information about the applications are used for automatic assignment. If sub-applications are used, then at step 176 sub-applications may be similarly assigned to application faces. Automatic assignments may be recorded in the stored metadata 124. When assignments are determined, including possibly ascertaining manual assignments from the metadata, the user interface can be displayed with the cube or cubes having the correspondingly assigned application icons therein.

Figure 6:
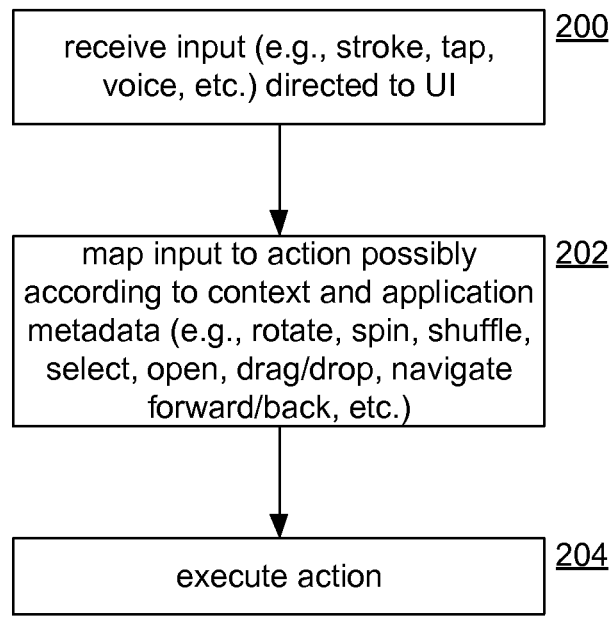
FIG. 6 shows a process for handling interactions with a three-dimensional user interface.

FIG. 6 shows a process for handling interactions with a three-dimensional user interface. At step 200 an input is received, for instance in the form of a stroke, a tap, a voice command, a tilt of the computing device (assuming gyros or accelerometers are present), mouse or button click, etc. At step 202 the input is analyzed according to the current user interface state, and an appropriate action is determined. At step 204 the action is executed.

Example inputs and actions will now be described. Rotation of a cube can be actuated by a tap input; for instance a tap on a corner or edge of a face may cause the cube to rotate in a corresponding plane to bring one or more new faces into view. Rotation may be actuated in directions corresponding to swipes or drags, either in nearest planes or in any arbitrary planes. Rotational direction may be according to a number of fingers swiping regardless of direction, for example, two fingers rotate up-down and three fingers rotate left-right. Any type of inputs may be used.

The user interface may have different input modes. A first input mode may direct user inputs to rotational operations, whereas a second mode may direct user inputs to navigational operations such as selecting a parent or child cube, selecting face, activating an application icon, and so on. A third input may direct user inputs to applications themselves.

The duration of an input may influence the extent of rotation. As a cube rotates it may snap into various pre-determined orientations. In one embodiment where multiple faces of a volume are usually or always displayed at one time, a rotation may shift multiple faces out of and into view. In the case of a cube, a user setting or particular input may cause the cube to rotate two times. In another embodiment, the user input invokes a "flip" action that rotates the cube or volume 180 degrees. In the case of a cube, if three faces are displayed at a time, a flip causes the back three faces to become the front three faces. In another embodiment, rotation may be determined in part according to device orientation. In yet another embodiment, a random spin may be invoked (e.g., by shake of a motion-sensing device); the direction or extent of rotation may be random. If multiple cubes are displayed, different cubes may spin in different directions and for different durations (degrees of rotation).

Figure 7:
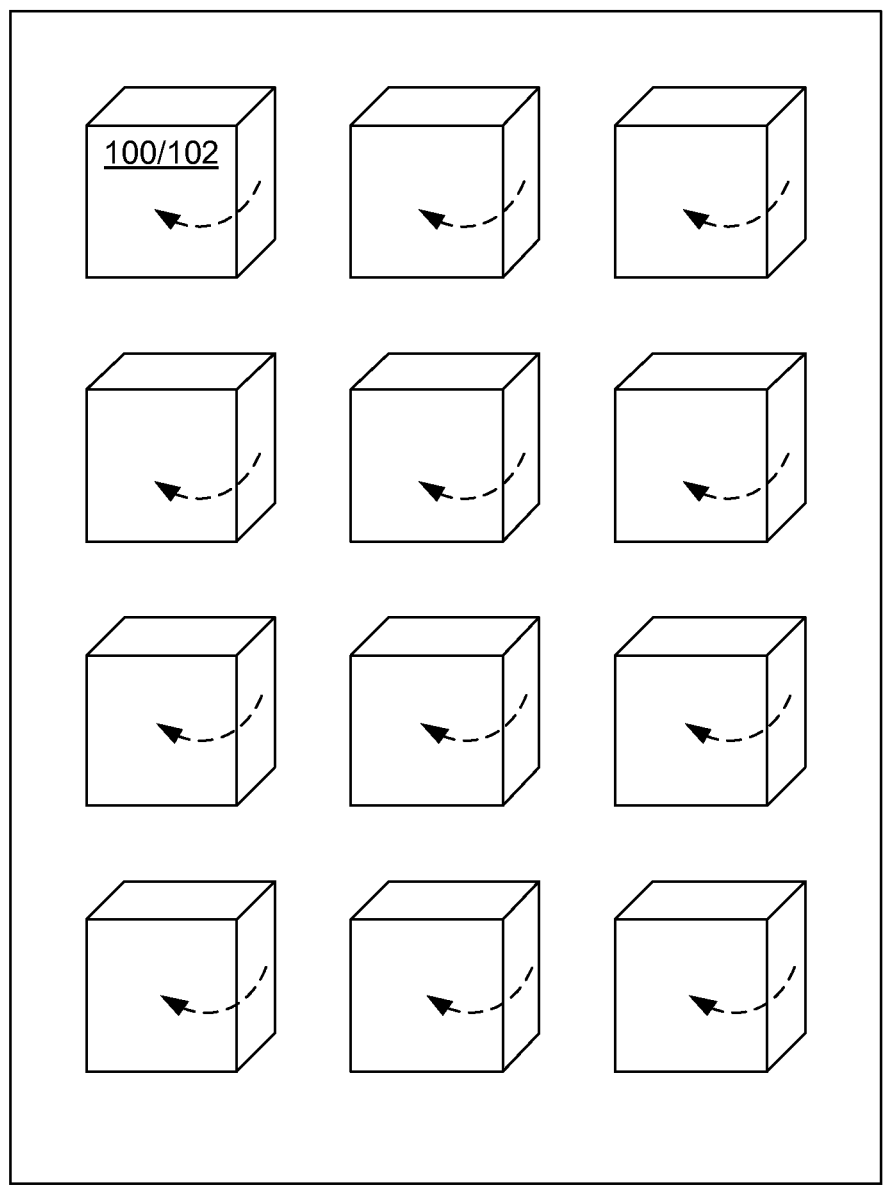
FIG. 7 shows a detailed view of a first user interface.

FIG. 7 shows a detailed view of first user interface 104, which is a composite view of cubes 100/102. The interactions described (e.g., rotations, navigations) above can be applied equally to the user interface 104. That is, the user may manipulate cubes en masse just as an individual cube may be manipulated. For example, if the user provides an input for a "rotate-left" action, all of the cubes 100/102 rotate or swivel left in unison. Alternatively, a user may select a subset of cubes 100/102 to rotate, for instance, by selecting cubes with a designated trait, or tag, by dragging a region of the user interface, etc.

When multiple cubes are displayed, the user interface may allow a user to add new cubes, shuffle cubes, move cubes, duplicate cubes, delete cubes, pin/unpin cubes, and group/ungroup cubes. A search facility may be provided to allow the user to search for applications, in which case cubes may automatically rotate to show faces with applications that match a search. Cubes with matching applications may also be shuffled to the top of the user interface or duplicated onto a results cube.

In one embodiment, a number of applications or sub-applications that can be contained by a face (or cube) will be configurable by the user. Thus, the number of faces that can actively contain applications or sub-applications will be configurable during a setup stage or dynamically.

Figure 8:
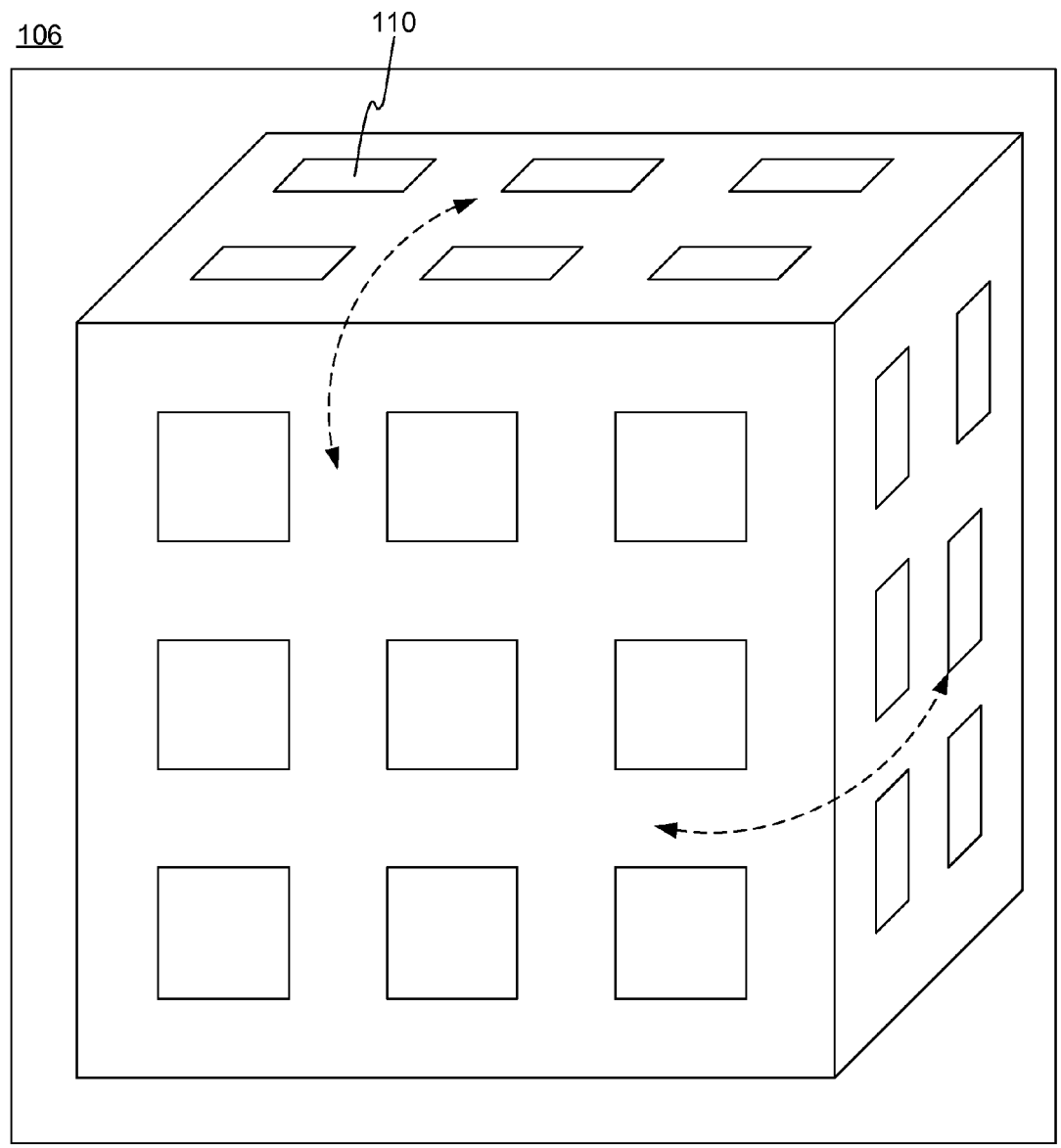
FIG. 8 shows a detailed view of a second user interface.

FIG. 8 shows a detailed view of the second user interface 106; another composite view. In this embodiment a parent or container cube contains multiple application icons 110 on each face. Icons 110 may be moved, copied, etc., between faces and/or other cubes (if multiple cubes are present). An icon can be activated to cause a transition either directly to the corresponding application (two-dimensional) or to a corresponding application cube. FIG. 9 shows another implementation of second user interface 106. With this embodiment, a parent cube 220 acts as a container with child cubes 222 on or near its faces. The parent cube 220 may be rotated and manipulated as a cube as described above. Contained sub-cubes might also rotate synchronously as the larger cube rotates, thus allowing an effect such as keeping the same sub-cube faces facing toward the user as the containing larger cube rotates. The child or sub-cubes 222 may be rotated and interacted with as a whole or individually.

Figure 10:
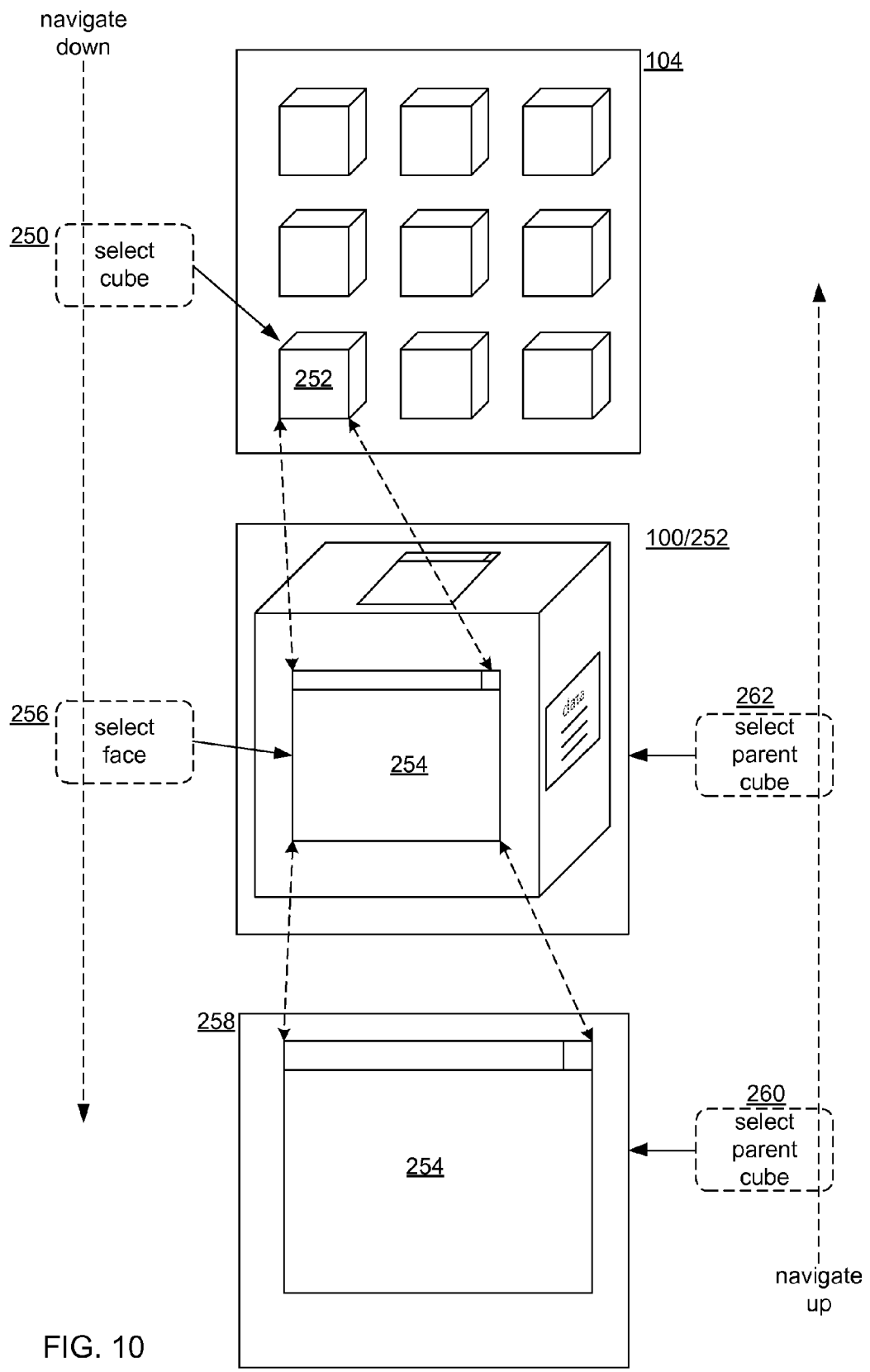
FIG. 10 shows an embodiment for hierarchical nesting and navigation.

FIG. 10 shows an embodiment for hierarchical nesting and navigation. It may be assumed that information is maintained that provides a hierarchical arrangement (nesting) of cubes (a hierarchy of container-contained relationships). For example, the first user interface 104 acts as a root view with cubes 100/102 contained therein (the root view might also be another type of composite view described herein). Note that the user interface 104, instead of being a root view, might be a child of another composite view. A user navigates down the hierarchy by a first input 250 to select a cube 252. The cube 252 is then transitioned into view (e.g., by an animation zooming in and centering the selected cube 252). When a face 254 is selected with a second input 256, the corresponding application 258 becomes the active view. Similarly, the user interface can be navigated back up the hierarchy. From the view of the application 258, a third input 260 transitions the view to the cube 252, and a fourth input 262 transitions the view from the cube 252 to the first user interface 104. Navigation may also be from cube to cube, using corresponding user inputs. For example, a user may navigate in turn from one cube to a logical next cube, with corresponding graphical transitions.

In one embodiment, the depth of possible interactivity can vary. In other words, what entities the user can interact may vary. For example, an application icon may be a miniaturized thumbnail of the actual application and the user can direct input directly to the underlying application through its icon. This approach may be used whether the application icon is shown in a single cube view or a composite view of cubes.

In another embodiment, if an application has only one user interface element such as a main window (no sub-applications), the application is displayed in ordinary two-dimensional fashion. If the application happens to create sub-applications while executing, the user interface can automatically transition to a cube view with a new face for the sub-application.

Regarding dynamic adding of cubes and faces, an embodiment may be used where the number of faces of a volume changes dynamically. Faces may be added while morphing the volume into a new polyhedron or other shape. Also, cubes may be dynamically grown and shrunk to accommodate new icons for applications or sub-applications. Moreover, cubes or their faces may be resized manually by the user.

While the act of dragging or copying icons between faces and cubes has been discussed, a user interface may also be designed to allow a user to move/copy cube faces per se between cubes.

While navigation is generally controlled by user input, device events such as incoming phone calls, software updates, alarms, and others can trigger navigation events to bring particular faces or cubes to the fore.

Another embodiment may involve saving the state of one or more cubes to a network resource such as a cloud, a web service, etc. The state of a cube and its corresponding application state can be captured and stored on a network resource. State may include information about which applications or sub-applications are associated with which cubes and/or cube faces, what state the applications are in, what documents or other application data are in use, and so forth. The state of a cube stored in a network cloud may also be loaded on another device, thus allowing mirroring or reproduction of the cube from device to device.

In a further embodiment, user interactivity with a cube simultaneously controls an application executing in association with the cube. For example, a cube for a video application may have video clips playing on respective faces. As the user rotates from face to face, only the video clip in the currently front-facing or active face is played, while video clips in other of the faces enter a buffering state. In another example, a mapping program may have faces that are active or dormant according to whether the faces are in focus or are currently displayed.

Conclusion

Embodiments and features discussed above can be realized in the form of information stored in volatile or non-volatile computer or device readable storage media. As used herein, "media" or "medium" is deemed to exclude energy, signals, carrier waves, and the like. These terms are deemed to include at least media such as optical storage (e.g., compact-disk read-only memory (CD-ROM)), magnetic media, flash read-only memory (ROM), or any current or future means of storing digital information with physical material. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or operating system virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A three-dimensional user interface displayed on a display of a computing device, the user interface comprising:
a three-dimensional shape comprised of a plurality of faces, the three-dimensional shape rotating according to user input to alternatively display, as a current frontward face, various of the faces, the current frontward face comprising a face to which user input is able to be directed; and
the faces each having respective graphics corresponding to and representing respective elements of a same application, wherein a first face with a first element comprises a first media item playable by the application wherein a second face with a second element comprises a second media item playable by the application wherein both the first media item and the second media item are video clips and rotation of the three-dimensional shape by the user controls playback of the first and second media item by the application, the controlling comprising responding to a rotation of the three-dimensional shape by:
when the first face is the current frontward face and as a result of the rotation, the first face stops being the frontward facing face, responding by automatically pausing playback of the first media item and the second face becomes the frontward facing face, responding by automatically resuming playback of the second media item; or,
when the second face is the current frontward face and as a result of the rotation, the second face stops being the frontward facing face, responding by automatically pausing playback of the second media item and the first face becomes the frontward facing face, responding by automatically resuming playback of the first media item.

2. A three-dimensional user interface according to claim 1, wherein the elements of the application comprise items of content managed by the application, and wherein user interactions that rotate the three-dimensional shape concurrently control operation of the application such that execution of the application changes when the three-dimensional shape is rotated.

3. A three-dimensional user interface according to claim 1, wherein which faces contain which of the graphics is interactively controlled by the user, whereby the user interactively determines which elements correspond to which of the faces.

4. A three-dimensional user interface according to claim 1, wherein the faces of the three-dimensional shape comprise respective polygons, the three-dimensional shape comprises a polyhedron, and the three-dimensional user interface enables the user to interactively rotate the polyhedron.

5. A three-dimensional user interface according to claim 4, wherein, automatically or by user input, the polyhedrons dynamically increase and decrease in number of sides, or the number of faces of the polyhedron dynamically increases and decreases.

6. A three-dimensional user interface according to claim 1, wherein the three-dimensional user interface enables the user to interactively attach or detach arbitrary applications on the computing device or elements thereof to the three-dimensional shape and/or a face thereof.

7. A three-dimensional user interface according to claim 1, the process further comprising saving a state of the three-dimensional shape to a network resource from which it becomes available for use on another computing device.

8. One or more computer-readable storage media storing information to enable a computing device comprising a processor, a display, and storage, to perform a process, the process comprising:
storing a plurality of applications on the storage, each application having a corresponding graphic;
displaying a user interface on the display of the computing device, the user interface comprising a plurality of interactive shapes comprising three-dimensional volumes each comprised of a respective plurality of faces, each shape having at least one rotatably changeable frontward facing face, wherein the user interface enables a user of the computing device to interactively rotate one of the shapes thereby causing a graphic three-dimensional rotation of the interacted-with shape such that a new face of the rotated shape becomes the frontward facing face of the rotated shape, and wherein execution of the applications is controlled by interaction with the three-dimensional volumes, wherein the user interface responds to a single rotate command from the user by simultaneously rotating each of the interactive shapes, and wherein as the one of the shapes rotates from a first face to a second face, another shape with a third and fourth face simultaneously rotates the third face from facing frontward as the fourth face rotates to face frontward.

9. One or more computer-readable storage media according to claim 8, the process further comprising responding to a search command inputted by the user to search data related to the applications by displaying the three-dimensional volumes simultaneously rotating.

10. One or more computer-readable storage media according to claim 9, wherein shapes having applications that match search criteria inputted with the search command stop spinning as an application associated therewith is found.

11. One or more computer-readable storage media according to claim 8, the process further comprising storing categories of the applications, and automatically assigning the applications to the shapes according to the categories.

12. One or more computer-readable storage media according to claim 8, further comprising enabling the user to install new applications on the shapes, move applications between shapes, instantiate new shapes, and remove shapes.

13. One or more computer-readable storage media according to claim 8, further comprising responding to a user selection of a given face of a given shape by newly displaying a three-dimensional application shape faces corresponding to elements of the application, the elements comprising user interfaces of the given application and/or graphical indicia of data associated with the application.

14. A method performed by a computing device, the method comprising:
executing a graphical user interface comprising a plurality of three-dimensional interactive user interface elements, each user interface element comprised of a plurality of faces for displaying information for one or more applications on the computing device, the graphical user interface having a reference direction;
displaying the user interface elements;
displaying the user interface elements rotating independently responsive to rotate commands inputted by a user; and
displaying the interface elements rotating in unison responsive to a single rotate command, wherein the graphical user interface responds to the single rotate command from the user by simultaneously displaying rotation of each of the user interface elements, the rotation in unison comprising, as one of the user interface elements with a first face and a second face rotates from the first face aligning with the reference direction to the second face aligning with the reference direction, another user interface element with a third and fourth face simultaneously rotates from the third face aligning with the reference direction to the fourth face aligning with the reference direction.

15. A method according to claim 14, further comprising receiving a user input designating a plurality of the user interface elements, and responsive to a second single rotate command, rotating the designated plurality of user interface elements in unison.

16. A method according to claim 14, wherein the graphical user interface comprises a container user interface element comprising a face, the face comprising the user interface elements, the method further comprising rotating the container user interface element responsive to user input.

17. A method according to claim 16, wherein the single user input comprises an input that rotates the container user interface element, and the user interface elements rotate in synchronization with rotation of the container user interface element.

* * * * *